United States Patent [19]

Dorumsgaard et al.

[11] Patent Number: 4,648,774
[45] Date of Patent: Mar. 10, 1987

[54] LOAD/UNLOAD APPARATUS FOR DISC-LIKE WORKPIECES

[75] Inventors: John A. Dorumsgaard, Arden Hills; Roger H. Amerson, Bloomington, both of Minn.

[73] Assignee: Methods, Inc., New Brighton, Minn.

[21] Appl. No.: 778,078

[22] Filed: Sep. 20, 1985

Related U.S. Application Data

[60] Division of Ser. No. 751,098, Jul. 2, 1985, Pat. No. 4,569,625, which is a continuation-in-part of Ser. No. 470,046, Feb. 28, 1983, abandoned.

[51] Int. Cl.<sup>4</sup> ............................................. B65G 65/34
[52] U.S. Cl. .................................... 414/416; 414/750; 414/908; 414/785; 414/662; 74/104; 901/16; 901/23
[58] Field of Search ............... 414/416, 749, 662, 592, 414/750–753, 275, 222, 225, 226, 908, 217, 785; 74/37, 104; 901/17, 21, 24, 19, 23, 16

[56] References Cited

U.S. PATENT DOCUMENTS

| | | | |
|---|---|---|---|
| 3,884,363 | 5/1975 | Ajlouny | 901/23 X |
| 4,151,922 | 5/1979 | Krumme | 414/416 |
| 4,370,092 | 1/1983 | Healy | 414/752 |
| 4,457,661 | 7/1984 | Flint et al. | 414/752 X |
| 4,466,766 | 8/1984 | Geren et al. | 414/225 X |
| 4,514,130 | 4/1985 | Gladish | 414/416 |
| 4,522,697 | 6/1985 | Dimock et al. | 414/416 X |
| 4,566,346 | 1/1986 | Petiteau | 414/749 X |

OTHER PUBLICATIONS

"Semiconductor Production"–pp. 30, 31 & 33–Autumn 1980.

Primary Examiner—Frank E. Werner
Attorney, Agent, or Firm—Orrin M. Haugen; Thomas J. Nikolai; Frederick W. Niebuhr

[57] ABSTRACT

Horizontally and vertically actuable apparatus for loading/unloading workpieces from a work station. The workpiece holder is contained on a driven workpiece holding tower having in one embodiment a laterally floating bearing coupled to an endless drive assembly whereby up/down motion is imparted relative to a controlled rotary motion in one direction. Horizontal motion is controlled via a driven endless notched belt and associated magnetic transducing and counting apparatus for determining relative horizontal position. Alternative embodiments of a driven pivoting roller arm and a driven lead screw are also disclosed for imparting respective vertical and horizontal motion.

3 Claims, 9 Drawing Figures

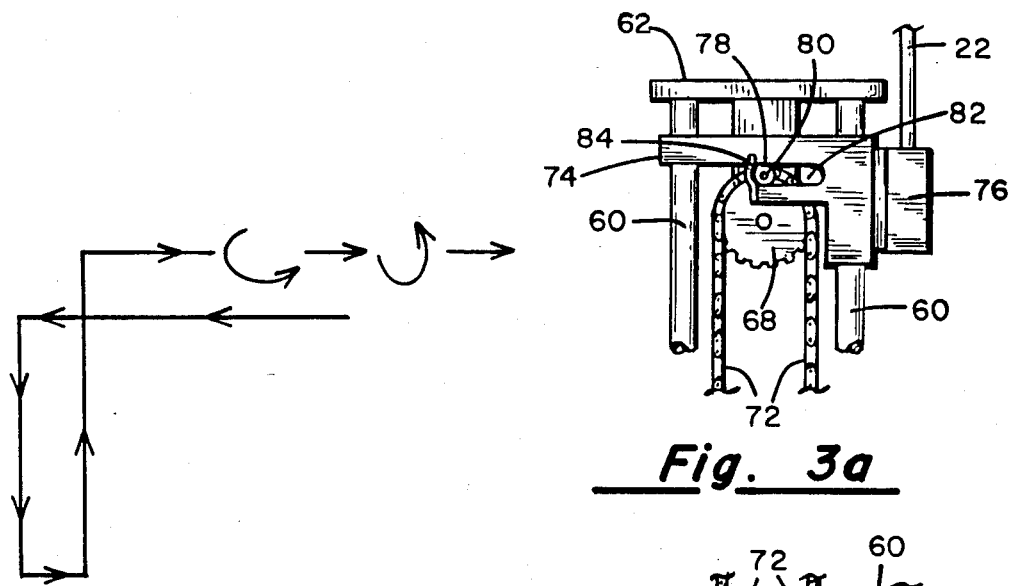
Fig. 3a
Fig. 5
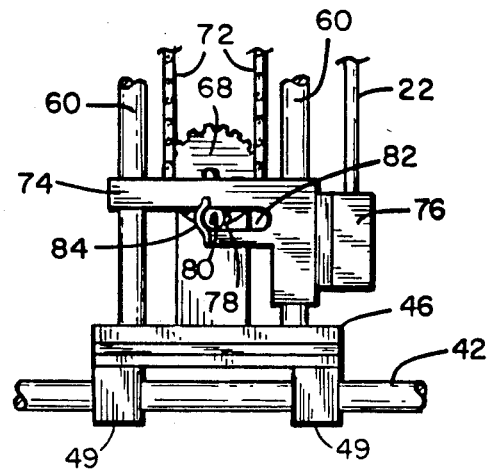
Fig. 3b
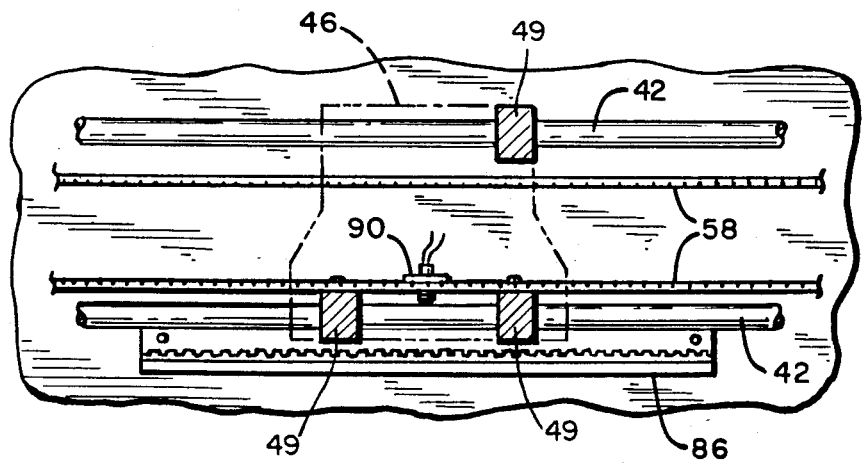
Fig. 4

LOAD/UNLOAD APPARATUS FOR DISC-LIKE WORKPIECES

This is a Divisional application of application Ser. No. 751,098, filed July 2, 1985 and issued as U.S. Pat. No. 4,569,625, which application was a Continuation-in-Part of application Ser. No. 470,046, filed Feb. 28, 1983, now abandoned.

BACKGROUND OF THE INVENTION

The present invention relates to apparatus for loading/unloading workpieces from a work station and, in particular, to apparatus for loading and unloading disc-like workpieces from a carrier and having associated endless drive mechanisms for controlling horizontal and vertical workpiece movement.

Loading and unloading disc-like workpieces from a work station has heretofore generally been accomplished via apparatus which supports the discs at one or more times on their flat surfaces as the discs are conveyed to or from the work station. Intermediate apparatus, in turn, manipulates the discs so as to rotate the discs to a desired orientation relative to the work station.

Depending upon the ultimate use for the discs and the type of materials used in the manufacture of the discs, such manipulations may damage the discs so as to make them unusable. In particular, during the manufacture of magnetic discs for computer memory applications and which eventually may contain data on one or more surfaces thereof, it is particularly important to minimize any contact with the ultimate data containing surfaces. It is therefore desirable to grasp the discs in a fashion where the upper and lower surfaces do not contact other than the intended work stations during the work process.

The present apparatus contemplates such a mechanism in that it grasps an interior edge and vertically loads/unloads the discs from a rack containing a plurality of the discs and horizontally conveys the discs to a work station where an appropriate operation is performed, such as buffing. It is to be recognized that while the present apparatus will be described hereinafter with respect to the loading and unloading of discs and relative to a buffing station, it may be suitably adapted for loading/unloading other workpieces and conveying the same to and from other work stations via associated transfer mechanisms.

Generally, the present apparatus is horizontally actuable via a notched endless belt and an associated driven gear and idler gear. The belt coacts with mating gears coupled to a vertically actuable tower assembly containing a workpiece holder. The horizontal position of the workpiece holder is controlled by means of a magnetic transducer which detects and counts various index markings. The vertical position, on the other hand, is controlled by means of a pair of driven sprockets, a pair of associated idler sprockets and a pair of endless chains coupled therebetween. A workpiece holding assembly is, in turn, coupled to the chains via an axle that is permanently affixed to each of the chains and which passes through a laterally floating bearing, whereby the workpiece holder moves up and down as the endless chains rotate about the sprockets.

In an alternative embodiment, a driven lead screw, along with a coacting position encoder and controller, is used to control horizontal work holder movement. In yet another embodiment, a pivoting roller arm coacts with the workpiece holder, between a pair of limit switches to control vertical work holder movement. A vibration dampened drive coupling isolates the roller arm from the drive motor.

The apparatus finds particular advantage in that it independently operates in the horizontal and vertical directions as it removes and replaces unfinished/finished discs from the disc holder. Rotary motion may also be independently applied by means of a rotary spindle coupled to the workpiece holder.

The above objects, advantages and distinctions of the present apparatus as well as various others will, however, become more apparent upon reference to the following description thereof with respect to the appended drawings.

SUMMARY OF THE INVENTION

Workpiece loading/unloading apparatus for selecting a rack mounted workpiece, vertically lifting the workpiece, horizontally conveying the workpiece and/or lowering the workpiece relative to an associated transfer and work station. Independent horizontal/vertical/rotational movement is achieved by means of corresponding drive mechanisms coupled to a workpiece holder. In one embodiment horizontal motion is imparted by means of a driven sprocket and an associated endless notched belt and idler sprocket coupled to a horizontally constrained table that moves in conjunction therewith and whose linear motion is controlled by means of a magnetic sensor/counter assembly which monitors adjacent index markings. Vertical motion, on the other hand, is controlled by means of respective pairs of driven and idler sprockets and associated chains coupled therearound and which have an axle coupled therebetween. The workpiece holder, in turn, contains a laterally floating bearing associated with the axle for following the chain as it revolves about said sprockets and whereby the workpiece holder is conveyed vertically up and down. A rotary drive motor is also coupled to the workpiece holder for rorating the workpiece as it is moved along a desired vertical/horizontal path.

In a particular embodiment, the apparatus acts to grasp and removed discs from a rack containing a plurality of unfinished discs, raise and rotate the discs, and convey the unfinished discs to a work station whereat a finished disc is received as an unfinished disc is rotated to be grasped by an associated transfer cradle. The finished disc is then horizontally conveyed to a finished position and whereat the finished disc is placed and the next adjacent unfinished disc is grasped.

Alternative embodiments are also contemplated including different horizontal and vertical motion assemblies. In one embodiment, the table is coupled to a driven lead screw and in conjunction with which a position encoder controls horizontal motion. In another, vertical motion of the workpiece holder is determined by a driven roller containing a pivot arm which supports a carriage containing the workpiece holder. A pair of coacting limit switches control the travel height and a vibration dampened coupler assembly connects a drive motor to the pivot arm.

BRIEF DESCRIPTION OF THE DRAWINGS

FIG. 3a shows a detailed front view of the follower carriage with the workpiece holder in its most vertical position.

FIG. 3b shows a front view of the follower carriage with the workpiece holder in its lowest vertical position.

FIG. 4 shows a cross-section view taken along lines 4—4 of FIG. 2 and wherein the details of the linear position sensor and index markings are more clearly shown.

FIG. 5 shows a generalized line diagram of the lateral/vertical/rotary motion typically imparted via the present apparatus.

DESCRIPTION OF THE PREFERRED EMBODIMENT

Figure 1:
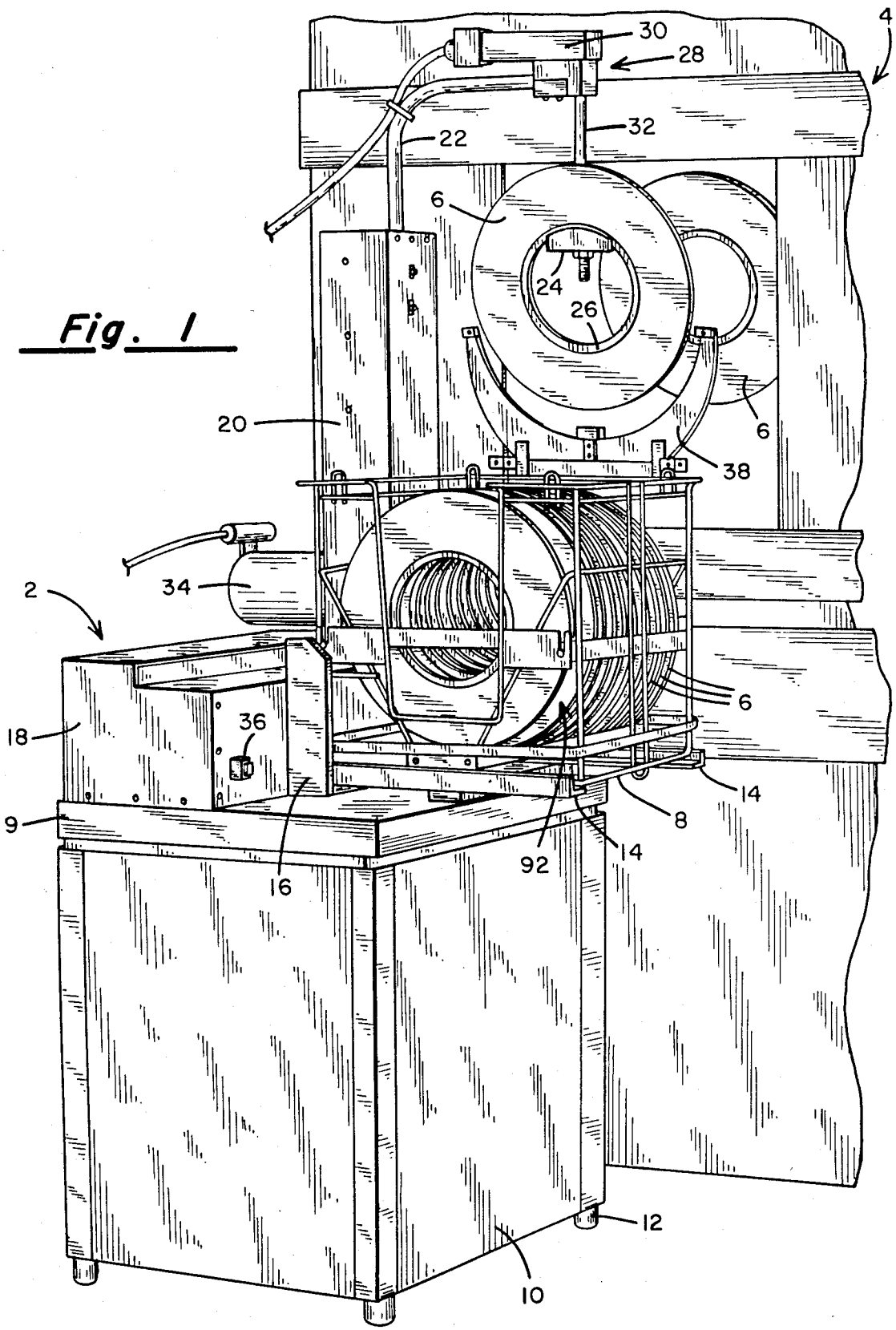
FIG. 1 shows a generalized perspective view of the present apparatus relative to a disc buffing work station.

Referring to FIG. 1, a generalized perspective view is shown of the present loading/unloading apparatus 2 relative to a buffing assembly in work station 4. The apparatus functions to remove unfinished computer memory discs 6 from a basket 8 containing a plurality of finished/unfinished discs 6, and convey the discs 6 to a buffing assembly operating within work station 4, whereat the finished discs 6 are grasped and returned to the basket 8. In a similar fashion, each of the unfinished memory discs 6 within the basket 8 are sequentially conveyed to the buffing assembly within work station 4 and returned to the basket 8.

The basket 8 rests on the table 9 of a cabinet 10, which is supported by four legs 12 so as to place the basket 8 at a height compatible with the buffing assembly in work station 4. The basket 8 is, in turn, constrained on the top of the table 9 by bottom and side support rails 14 and 16 such that the basket 8 may be slidably removed upon completing the buffing of all of the discs 6 contained therein.

Immediately behind the basket 8 are positioned horizontal and vertical shrouds 18 and 20 and which cover the drive mechanisms used for controlling the vertical and horizontal movement of the discs 6. Associated with the vertical shroud 20 is a bent tower 22 and a hanger or a hook 24 for supporting the discs 6 along a metallic rim 26 that is formed on the edge of the bored hole through the center of each of the discs 6. This rim 26, in turn, matches the drive spindle of a mass computer memory as well as the spindle (not shown) inside the buffer assembly 4. Also associated with the disc-holding hook 24 and tower 22 is an electrically driven spindle assembly 28 that is bolted to the end of the tower 22 and a motor 30 which rotates the threaded rod 32 that supports the hook 24. Similary, a vertical stepper motor 34 is associated with the shroud 20 and the vertical tower 22 to drive the vertical control mechanism contained therein. Another stepper motor (not shown) is contained beneath the shroud 18 and controls the horizontal movement of the vertical shroud 20 and hook 24, but which assemblies will be described in greater detail hereinafter. Thus, upon applying power to the present loading/unloading assembly 2 via on/off switch 36, the apparatus operates to controllably move the disc-holding hook 24 horizontally and vertically, as well as rotatively, as it conveys the discs 6 from the basket 8 to the buffer assembly within the work station 4 and back to the basket 8.

Before continuing it is to be noted that the buffer assembly within work station 4 contains a horizontally and vertically actuable cradle 38 which receives the individual unfinished discs 6 from the hook 24; conveys the unfinished discs 6 to a buffer spindle; and grasps the finished discs and conveys them to the hook 24. Buffer assemblies of the type disposed in work station 4 are commercially available under the code name "Model 1400" disc buffer from Methods, Inc., assignee of the present invention.

Figure 2:
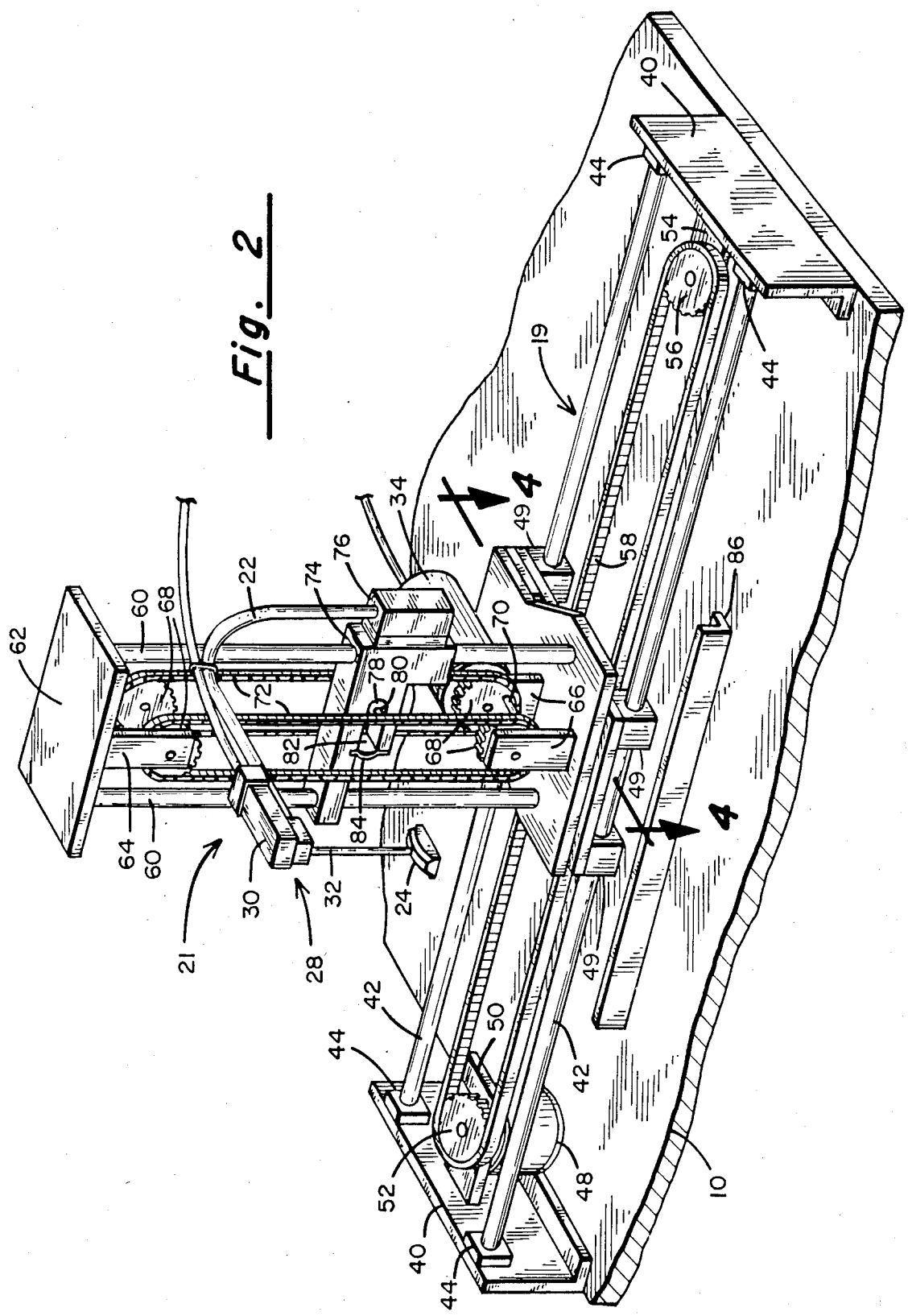
FIG. 2 shows a perspective view of the drive mechanisms of the present loading/unloading apparatus.

Referring next to FIG. 2, a perspective view is shown of the coacting horizontal drive assembly 19 and vertical drive assembly 21 for controlling the horizontal and vertical movement of the hook 24 and which are encased beneath the shrouds 18 and 20. In particular, the drive assemblies 19 and 21 are mounted to the top 9 of the cabinet 10 via angle brackets 40 which support the assemblies at a desired height thereabove to permit free movement and which are interconnected via cylindrical guide rails 42 that are contained by associated end mounting blocks 44. The vertical drive assembly 21 is, in turn, supported by a table 46 that is slidably associated with the guide rods or rails 42 via four bored and bushed pads 49 which coact with the guide rods 42 so as to constrain the movement of the table 46 back and forth along the guide rods 42.

Horizontal drive power is supplied to the table 46 via horizontal drive motor 48 which is mounted to and spaced away from the left end bracket 40 via a mounting member 50. Intermediate the horizontal drive motor 48 is a speed reducer (not shown) and which couples the motor 48 to the notched sprocket 52. Mounted to the right end bracket 40 and spaced apart therefrom by means of a side mounting member 54 is an associated idler sprocket 56 which is mounted to the side support member 54 such that its axis of rotation may be shifted laterally via an adjusting bolt (not shown) mounted beneath the support 54. In this fashion, the idler sprocket 56 may be adjusted to control the tension applied to the notched drive belt 58.

The notched drive belt 58, in turn, is constrained within notched channels (not shown) mounted to the bottom of the table 46 such that they engage both interior notched surfaces of the looped belt 58. Thus, as the drive motor 48 rotates, the belt 58 causes the table 46 and vertical drive assembly 21 to move laterally to the right and left and thereby convey the hook 24.

Vertical movement, on the other hand, is controlled by the vertical drive assembly 21 and which is similarly constrained by two cylindrical guide rods 60 that are mounted to opposite sides of the table 46 and the top member 62. Spaced beneath the top member 62 and above the table 46 via side support brackets 64 and 66 are respective pairs of sprockets 68, the lower pair of which are interconnected and driven by motor 34, In particular, lower sprockets 68 are constrained to rotate in the same manner relative to one another via a connecting rod 70 (only one of which is shown) which couples each of the sprockets 68 of the lower pair to one another. Individual chains 72, in turn, are in driving relationship with the upper and lower sprocket pairs, such that as the motor 34 turns, the chains 72 revolve in unison relative to one another about the sprockets 68.

Mounted intermediate to the upper and lower sprocket pairs and constrained by the guide rods 60 is a gun-like appearing member 74 that is bored and contains bushings (not shown) so as to slidably move along the guide rods 60. Mounted to one side of the member 74 is the bent support tower 22 and which is attached to an associated support bracket 76. The member 74 is conveyed along the guide rods 60 by means of a laterally floating bearing 78. Specifically, the bearing 78 revolves about an axle 80 that is attached to each of the chains 72 such that as the chains revolve about the sprockets 68, the bearing 78 rotates about the axle 80. At the same time, because the axle 80 is constrained within an elongated slot or open-ended aperture 82 within the member 74, and which is bound on its left side by a clevis 84, the member 74 and the hook 24 are raised and lowered in coincidence with the movement of the chains 72.

During such motion, it is to be recognized that the bearing 78 remains relatively stable, in that no lateral forces are exerted. However, as the chains and pinned axle 80 meet the upper or lower pairs of sprockets 68, a lateral force is applied and which is accommodated via the slot 82 such that the bearing 78 shifts laterally as the axle 80 moves over the sprockets 68 until the bearing 78 reaches the clevis 84 at the opposite sides of the sprockets 68. Similarly, as the chains 72 reach the lower sprockets 68, the bearing 78 moves to the right of the slot 82, assuming counterclockwise rotation of the chains 72. The details of such movement can, however, be seen in greater particularity with reference to FIGS. 3a and 3b.

From FIGS. 3a and 3b, it is to be noted that the width of the elongated slot 82 is less than the width between the opposite sides of the chains 68. Specifically, for the present embodiment, the end sprockets 68 are approximately 2.8 inches in diameter, and the width of the slot 82 is approximately 1.8 inches. Empirically, it has been found that such a relative spacing provides for the smoothest transition as the axle 80 rotates over the tops of the sprockets 68. It is also to be noted that the width of the member 74 is such that at the apices of the axle 80's travel, the member 74 does not contact the center axles of the sprockets 68.

Attention is again directed to FIG. 2 and the hook 24. It is to be noted that the hook 24 is formed so as to have symmetrical "V" grooves for receiving and supporting the discs 6. Also, because the grooves are symmetrical, the hook 4 is able to support two discs 6 at a time, most generally one unfinished disc 6 and one finished disc 6, but which will become more apparent hereinafter. Also, it is to be noted that a rail 86 is provided on the top of the cabinet 10, slightly beneath the path of travel of the table 46. The rail 86 contains a number of index notches/lobes on its one side and which may be seen in greater detail in FIG. 4.

Referring to FIG. 4, it is to be seen that the index notches extend the length of the rail 86 relative to a magnetic transducer 90. The transducer 90 acts in conjunction with asociated circuitry (not shown) to detect changes in magnetic flux as each of the lobes and notches are encountered and which changes are counted and compared so as to generate a relative count indicative of the horizontal position of the table 46. It is to be recognized that, in lieu of a magnetic transducer 90, various other techniques, such as photo detection or the like, may be similarly employed for monitoring relative horizontal position. It is also to be recognized that while the present embodiment does not employ a similar vertical position indicator, such apparatus could also be incorporated on the vertical column relative to the member 74. However, for the present embodiment, the vertical travel is constrained by design to be compatible with that required for the associated buffer assembly within work station 4 and cradle 38.

Referring next to FIGS. 1 and 5, a typical sequence of steps performed by the present loading/unloading apparatus will be described. Assuming that a finished disc 6 is received from the cradle 38, the table 46 is moved laterally to the left and away from the buffer assembly within work station 4. Upon reaching the space 92 in the stack of discs 6, the motor 34 is enabled so as to lower the hook 24 and place the finished disc 6 in the basket 8. Next, the horizontal stepper motor 48 is enabled to move the hook to the right a sufficient distance to place one of the V-notches of the hook 24 beneath the metal rim 26 of the next unfinished disc 6. The hook 24 is then raised to its maximum position via the stepper motor 34, whereat the horizontal stepper motor 48 is again engaged so as to convey the hook to the right and towards the buffer assembly within work station 4. Intermediate thereto, the motor 30 is enabled to rotate the hook 24 180 degrees in a clockwise fashion, thereby presenting the empty V-groove of the hook 24 to the finished disc which is waiting in the cradle 38.

The cradle 38 is next typically lowered so as to place the finished disc 6 on the hook 24. The arms of the cradle 38 are now clear of the disc 6. The hook 24 is then again rotated 180 degrees to position the unfinished disc 6 relative to the cradle 38. Next, the arms of the cradle 38 are raised so as to grasp the unfinished disc 6 which is subsequently conveyed by the cradle 38 to the chuck (not shown) within the buffing assembly within work station 4. Meanwhile the finished disc is returned to the basket 8 at the position adjacent to the previously finished disc 6.

It is to be recognized that as the unfinished discs 6 are sequentially selected, the control circuitry operates to decrement an associated position register such that each successive disc is returned to the appropriate rack location, two spaces from its initial unfinished rack position. In other words, a space 92 is always provided between the finished and unfinished discs 6. Such a spacing requirement is necessitated by the dimensions of the present apparatus, but it is to be recognized that various control schemes can be employed for otherwise selecting and returning the unfinished/finished discs 6.

While the foregoing discussion of FIGS. 1 to 4 has described the invention with respect to a horizontal belt drive and a vertical chain drive, it is to be appreciated that other drive mechanisms may be used in lieu of one of the other of the already described drive mechanisms. In this regard, attention is next directed to FIGS. 6 and 7 and wherein a vibration dampened, pivoting roller arm vertical lift assembly 94 is shown. This assembly may be directly substituted for the previously described vertical lift assembly 21 by merely mounting the assembly 94 to the table 46 in aligned relation to the horizontal belt drive 19. Accordingly, the following description will be directed only to the assembly 94.

Figure 6:
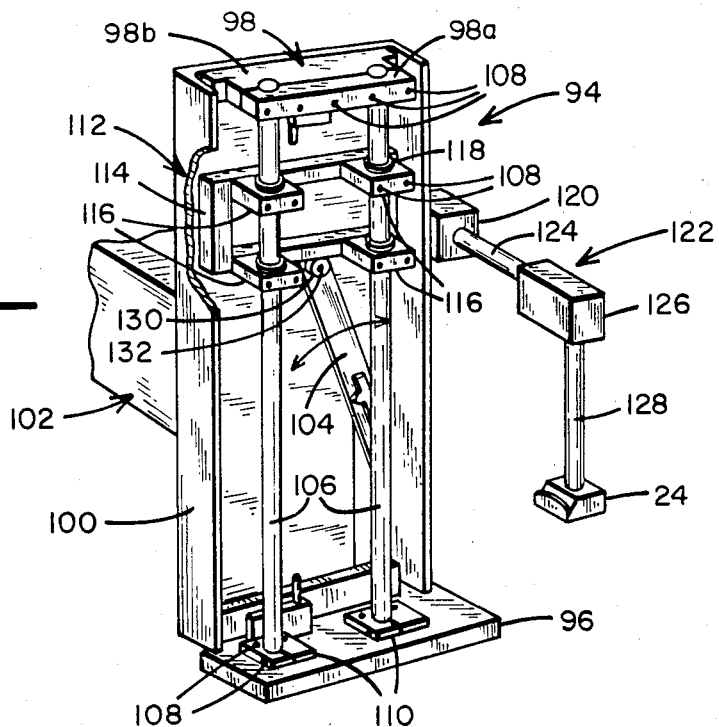
FIG. 6 shows a perspective view of an alternative pivoting roller arm assembly for imparting vertical motion.

Directing attention first to FIG. 6, it is to be noted that the assembly 94 operates in relation to a lower base plate 96 and an upper split top plate 98. A backing plate 100, which forms a portion of the vertical shroud (not shown) which normally surrounds the apparatus, extends between the plates 96 and 98 in secured relation to each. The motor drive assembly 102, in turn, extends rearwardly from the backing plate 100 and contains the drive motor and linkage that is used to controllably pivot the roller arm 104. The details thereof will be described hereinafter with respect to FIG. 7.

Like the assembly 21, a pair of guide rods 106 extend between the plates 96 and 98 and constrain the vertical motion of the hook 24 to a defined path. The guide rods 106 are coupled at their upper ends in a clamped fashion between the boltably secured halves 98a and 98b of the split top plate 98 and which halves are secured to one another by means of appropriate screw fasteners 108. The lower ends, in turn, are secured to the base plate 96 by means of split mounting plates 110 that are secured to the base plate 96 and clamped about the lower guide rod ends via their own screw fasteners 108.

Slidably constrained to the guide rods 106 is a vertical lift plate assembly 112. It is comprised of a backing plate 114 and four split bushing blocks 116 that are secured thereto via fasteners 108. Mounted centrally within each of the bushing blocks 116 and surrounding the guide rods 106 are individual slide bushings 118. Mounted in turn, to the right side of the plate 114 is a mounting block 120 and from which the hook support linkage 122 extends. That is, a support rod 124 extends outwardly therefrom to a transition block 126, and suspended from which is a short extension rod 128 and the disc support hook 24. In this latter regard, it is to noted that the disc support hook contains only a single "V" groove, although it is to be appreciated that a double "V" groove hook 24 might be used. Mounted, in turn, within the transition unit 126 is a rotary drive assembly (not shown) for rotating the hook 24 in the previously described fashion.

Whereas the previously described vertical lift assembly 21 used a chain drive to raise and lower the hook 24, the assembly of FIG. 6 is raised and lowered via a driven pivot arm 104 that is clamp-coupled at one end to the pivoting drive assembly 102 and at its outer end to a roller 130. The bearing containing roller 130 rides along and supports the bottom edge of the plate 114 such that as the pivot arm 104 rotates to and fro, the roller 130 turns about its axis 132 and rides to and fro along the bottom edge of the plate 114, which in concert therewith is raised and lowered. Mounted at the upper extreme ends of the plate 114's path of travel are individual limit switches 134 that contact the plate 114 and disrupt drive power to the pivot arm 104. By thus rotating the pivot arm 104 in an alternating clockwise and counterclockwise fashion, the disc support hook 24 is raised and lowered along a fixed path of travel relative to discs 6 contained within an appropriate rack and a desired work station.

Figure 7:
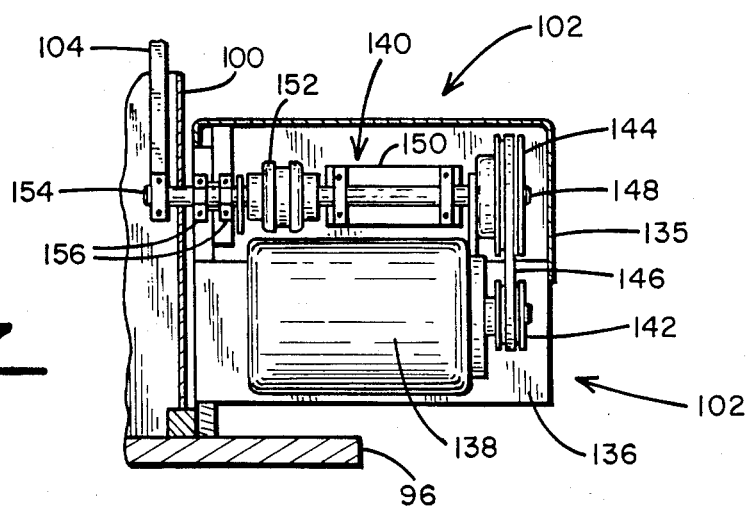
FIG. 7 shows an elevation view through the drive coupling to the roller arm of FIG. 6.

Turning attention next to FIG. 7, an elevation view is shown through the drive coupling assembly to the pivot arm 104 and which is surrounded by means of an associated shroud 135. Contained within the shroud 135 is a motor mounting plate 136 and to which are appropriately mounting a reversing stepper motor 138 and a vibration dampened drive linkage assembly 140. The motor 138 is coupled to the drive linkage 140 via a pair of pulleys 142 and 144 and a belt 146 extending therebetween. Rotation of the motor 138's output shaft is thus transferred to the laterally displaced drive shaft 148. The drive shaft 148, in turn, is supported from a pillow block assembly 150 and transfers drive power through a sleeve coupler 152 to a tail shaft 154 supported from a pair of bearings 156. The pivot arm 104, in turn, is clamp-coupled to tail shaft 154 and thus is caused to rotate in a vibration dampened fashion relative to the reversing operation of the motor 138. In this latter regard, where the chain drive 21 tended to produce more noise when it operated, the vertical lift assembly 94 has proven much quieter in operation.

Figure 8:
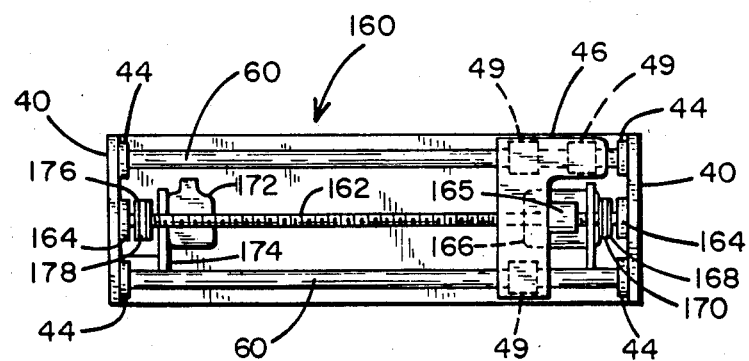
FIG. 8 shows a top view of an alternative driven lead screw assembly for imparting horizontal motion.

Turning attention now to FIG. 8, an alternative horizontal drive assembly 160 is shown which may be substituted for the horizontal belt drive assembly 19. It may be used in combination therefore with either of the vertical lift assemblies 21 or 94. Like the drive assembly 19, it is generally constructed to operate in sliding relation to a pair of laterally displaced guide rods 60 and suspended between and in sliding relation to which extends the support table 46. Whereas, however, the table 46 of FIG. 2 was supported by four bushed pads 49, the table 46 of FIG. 8 is supported by only three bushed pads 49.

Extending between the end rails 40 is a lead screw 162 which is supported from the end members or rails 40 by means of appropriate bearing assemblies 164. The lead screw 162 is coupled to a mating screw follower 165 clamped to the bottom of the table 46 and thus the table 46 is caused to slide to and fro along the guide rods 60 as rotational drive power is applied to the lead screw 162. In this latter regard and shown in phantom to the right end of the horizontal drive 160 is the drive motor 166. It is mounted beneath the lead screw 162 via an appropriate support bracket (not shown) and is coupled to the lead screw 162 via a pair of pulleys, only pulley 168 of which is shown, and a belt 170. Thus, as the lead screw 162 rotates, it coacts with the screw follower 165 to vary the horizontal position of the hook 24.

Turning attention next to the leftmost end of the horizontal drive 160, a position encoder 172 is shown. Like the motor 166, the position encoder 172 is mounted beneath the lead screw 162. In particular, a bracket assembly 174 supports the encoder 17 therefrom. A pulley 176 and belt 178, in turn, couple rotary motion of the lead screw 162 to a lower lying pulley (not shown) and the position encoder 172. The angular rotation of the lead screw 162 is thereby sensed and converted via the postion encoder 172 to attendant position control signals used by an associated automatic controller (not shown) and which are commerically available.

From FIGS. 6, 7 and 8, its is therefore to be appreciated that the alternative vertical and horizontal drive assemblies 94 and 160 may be used in combination with one another or substituted for the previously described horizontal and vertical drive assemblies 19 and 21.

It is to be further recognized that while the present apparatus has been described with respect to memory discs 6 and a buffer assembly within work station 4, alternatively it may be employed with various other workpieces and work stations. For example, it may be used to load/unload parts stored in a tray or basket relative to a milling machine or an inspection table or any other work station. Other appropriate transfer mechanisms may then transfer the parts to and from the holder 24. It is therefore to be recognized that while the present invention has been described with respect to a particular embodiment, various other applications and configurations may suggest themselves to others of skill in the art. Consequently, it is contemplated that the present invention as described and claimed should be interpreted so as to include all such equivalent structures as are within the scope of the following claims.

What is claimed is:

1. Apparatus for loading and unloading discs from a receptacle containing a plurality of discs organized in a predetermined disposition to one another comprising:
   (a) means insertable within said receptacle for supporting at least one of said discs along the inner peripheral edge of a central hole through said disc;
   (b) means for vertically reciprocally conveying said disc support means relative to said receptacle comprising:
      (1) a first member fixedly coupled and slidably mounted to said disc support means along a predetermined vertical path of travel,
      (2) a second member having a roller coupled thereto and in movable supporting relation to said first member,
      (3) means for reciprocally rotating said second member and said roller between a first angular position and a second angular position thereby raising and lowering said disc support means along a vertical axis relative to said receptacle,
   (c) means for horizontally reciprocally conveying said vertical conveyor means comprising:
      (1) a driven sprocket,
      (2) an idler sprocket,
      (3) an endless notched belt coupled to and trained around said driven and idler sprockets,
   (d) a third support member supporting said vertical conveyor means and coupled to said endless notched belt, whereby said vertical conveying means is caused to reciprocally move along a horizontal axis as said endless belt revolves about said driven and said idler sprockets; and
   (e) means coupled to said disc support means for selectively rotating each of said discs supported by said support means about an axis passing through the body of the disc as it is transported to and from said receptacle.

2. Apparatus as set forth in claim 1 wherein said disc support means includes at least one "V" groove for supporting said inner peripheral edge of said central hole through said disc.

3. Apparatus for loading and unloading discs from a receptacle containing a plurality of discs organized in a predetermined disposition to one another comprising:
   (a) means insertable within said receptacle for supporting at least one of said discs along the inner peripheral edge of a central hole therethrough;
   (b) means for vertically reciprocally conveying said disc support means relative to said receptacle comprising:
      (1) a first member fixedly coupled and slidably mounted to said disc support means along a predetermined vertical path of travel,
      (2) a second member having a roller coupled thereto and in movable supporting relation to said first member,
      (3) means for reciprocally rotating said second member and said roller between a first angular position and a second angular position thereby raising and lowering said disc support means along a vertical axis relative to said receptacle,
   (c) means for horizontally reciprocally conveying said vertical conveyor means comprising:
      (1) a lead screw,
      (2) means for reciprocally operating said lead screw,
      (3) a third support member supporting said vertical conveyor and threadably coupled to said lead screw, whereby said vertical conveyor means is caused to move to and fro along a horizontal axis, and
   (d) means coupled to said disc support means for selectively rotating each of said discs supported by said support means about an axis passing through the body of the disc as it is transported to and from said receptacle.

* * * * *